United States Patent [19]

Pastor et al.

[11] Patent Number: 4,670,072

[45] Date of Patent: Jun. 2, 1987

[54] METHOD OF MAKING A STRETCHED SURFACE RECORDING DISK

[75] Inventors: Sheldon L. Pastor, St. Paul; John W. Louks, North St. Paul, both of Minn.

[73] Assignee: Minnesota Mining and Manufacturing Company, St. Paul, Minn.

[21] Appl. No.: 827,145

[22] Filed: Feb. 7, 1986

Related U.S. Application Data

[62] Division of Ser. No. 433,953, Oct. 13, 1982, Pat. No. 4,573,097.

[51] Int. Cl.⁴ .............................................. B32B 31/16
[52] U.S. Cl. .................................... 156/73.1; 156/163; 156/229; 156/292; 156/295; 156/299; 428/63
[58] Field of Search ..................................... 428/63–65, 428/694; 360/133, 135; 156/160, 163, 229, 297, 212, 292, 295, 299, 73.1, 580.2

[56] References Cited

U.S. PATENT DOCUMENTS

| | | | |
|---|---|---|---|
| 2,662,804 | 12/1953 | Hutton | 356/137 |
| 3,130,110 | 4/1964 | Schmidt | 161/42 |
| 3,336,583 | 8/1967 | Comstock | 340/174 |
| 3,373,413 | 3/1968 | Treseder | 340/174 |
| 3,427,705 | 2/1969 | Campbell | 156/163 |
| 3,488,646 | 1/1970 | Sugaya et al. | 340/174 |
| 3,509,274 | 4/1970 | Kihara | 178/6.6 |
| 3,537,083 | 10/1970 | Voth | 340/174 |
| 3,599,226 | 8/1971 | Lips | 346/74 |
| 3,668,658 | 6/1972 | Flores et al. | 340/174 |
| 3,805,292 | 4/1974 | Hashiguchi et al. | 360/135 |
| 3,808,079 | 4/1974 | Akashi et al. | 156/241 |
| 4,121,964 | 10/1978 | Berkowitz | 156/580.2 |
| 4,365,257 | 12/1982 | Gerfast | 346/135.1 |
| 4,447,899 | 5/1984 | Geyer | 360/102 |
| 4,453,246 | 6/1984 | Covington | 360/135 |
| 4,480,282 | 10/1984 | Brock | 360/99 |
| 4,543,619 | 9/1985 | Pastor | 360/60 |

FOREIGN PATENT DOCUMENTS

| | | | |
|---|---|---|---|
| 2342890 | 8/1973 | Fed. Rep. of Germany. | |
| 2344744 | 3/1975 | Fed. Rep. of Germany | 360/135 |
| 1321088 | 6/1973 | United Kingdom | 360/135 |

*Primary Examiner*—Donald E. Czaja
*Assistant Examiner*—Merrell C. Cashion, Jr.
*Attorney, Agent, or Firm*—Donald M. Sell; James A. Smith; David W. Anderson

[57] ABSTRACT

A support for a stretched recording film and method of attaching the film to the support. The support includes a flat disk-shaped base, an annular upstanding rim which terminates in a reference surface, an annular radially extending bonding lip which includes a bonding surface inclined with respect to the plane of the base, and a groove separating the reference surface and the bonding surface. The method of attaching the film to the support includes deflecting the center of the base to decrease the diameter of the bonding surface, bonding the film to the bonding surface, and ceasing to deflect the base so that the diameter of the bonding surface increases to induce tension in the film. A second protective layer of film may be simultaneously stretched over and bonded to the first layer of film.

5 Claims, 6 Drawing Figures

METHOD OF MAKING A STRETCHED SURFACE RECORDING DISK

This is a division of application Ser. No. 433,953, filed Oct. 13, 1982, now U.S. Pat. No. 4,573,097.

BACKGROUND OF THE INVENTION

1. Technical Field of the Invention

This invention relates to magnetic recording media and, particularly, a flexible magnetic recording sheet stretched across a rigid, disk-shaped support to provide a planar recording surface.

2. Description of the Prior Art

Conventional, commercially available linear tape recording systems have excellent fidelity characteristics, are durable and are relatively inexpensive. The main shortcoming of linear tape systems is that access to different portions of the tape requires a relatively large amount of time.

A disk configuration, on the other hand, will allow random access to different portions of the magnetically recorded material since all of the material is available on one plane. In addition, a plurality of magnetic transducer heads may be used in conjunction with a disk to provide rapid access to random portions of the material recorded on the disk.

One type of recording disk configuration presently in wide-spread use is the so-called "floppy" disk, such as illustrated in U.S. Pat. No. 3,668,658 issued to Flores et al. This disk type consists of a relatively thick sheet of polymeric material which includes a magnetizable surface coating. Floppy disks are both inexpensive and convenient to use. Drawbacks associated with this type of disk, however, are that the disk experiences relatively large dimensional changes in response to temperature and humidity fluctuation and that a pressure pad opposite the head is required which causes wear, limits the rotational speed and, hence, reduces access times.

Stretched surface recording (SSR) disks are shown in U.S. Pat. Nos. 2,662,804 (Hutton); 3,130,110 (Schmidt); 3,336,583 (Comstock); 3,373,413 (Treseder); 3,488,646 (Sugaya); 3,509,274 (Kihara); 3,537,083 (Voth); 3,599,226 (Lips); and German Offenlegungsschrift No. 2,342,890 (Boissevain). The SSR disks described in the foregoing patents typically include a concave base having a rim across which is stretched a polymeric sheet, such as polyethylene terephthalate polymer (Mylar), coated with iron oxide. This type of disk is superior to floppy disks in that a pressure pad is not required and the recording surface has substantially the same dimensional stability as the relatively massive base to which it is attached. In addition, the SSR disk provides an extremely flat recording surface which may be deformed slightly to conform to a transducer head and irregularities in the surface of the head.

In spite of the advantages of SSR disks over floppy disks, SSR disks have not been commercially successful, perhaps because of production costs and the difficulty of producing a consistent tensioned surface in a production setting.

The success and utility of an SSR disk depend upon maintaining the recording surface in a tensioned condition across the rim of the support and reliably attaching the recording film to the support. It has been difficult in a production setting to adequately and uniformly tension the recording surface without using elaborate and expensive equipment and fixturing, and it has been difficult to reliably attach the recording surface to the support because of the inherent difficulties in attaching a very thin sheet to a relatively massive object without damaging the sheet.

SUMMARY OF THE INVENTION

The present invention concerns a support which includes separate film reference and bonding surfaces which ensures that the attachment of a recording film to the support will not interfere with the flatness of the film surface, a method of ultrasonically welding the recording film to the support which utilizes an energy dissipating protective second film to protect the recording surface and enhance the integrity of the bond between the film and the support, and a method of assembling the recording film to the support which ensures that uniform and adequate tension is applied to the recording film.

The support includes a flat disk-shaped base, an annular upstanding rim which extends from the perimeter of the base and terminates in a reference surface, an annular film bonding lip which extends radially outward from the upstanding rim substantially parallel to the base and which includes a film bonding surface which may be inclined with respect to the plane of the base, and a groove separating the reference surface and the bonding surface to accommodate surplus material produced during the bonding process and prevent such material from interfering with contact between the film and the reference surface.

The method of ultrasonically welding the film to the support includes simultaneously welding a second protective film to the recording film as the recording film is welded to the support. The second film dissipates energy produced during the welding process and prevents heat damage to the recording film and also protects the recording surface of the film from contaminants prior to assembly of the film and support into a housing. The bond between the second protective film and the recording film is not as strong as the bond between the recording film and the support, thus permitting the protective film to be peeled from the recording film without disturbing the bond between the recording film and the support.

The method of assembling the recording film to the support includes deflecting the center of the base to decrease the diameter of the reference and bonding surfaces, ultrasonically welding the recording film to the bonding surface, and releasing the base so that the natural resiliency of the material comprising the base tends to increase the diameter of the reference and bonding surfaces and induce tension in the recording film.

DETAILED DESCRIPTION OF THE INVENTION

Figure 1:
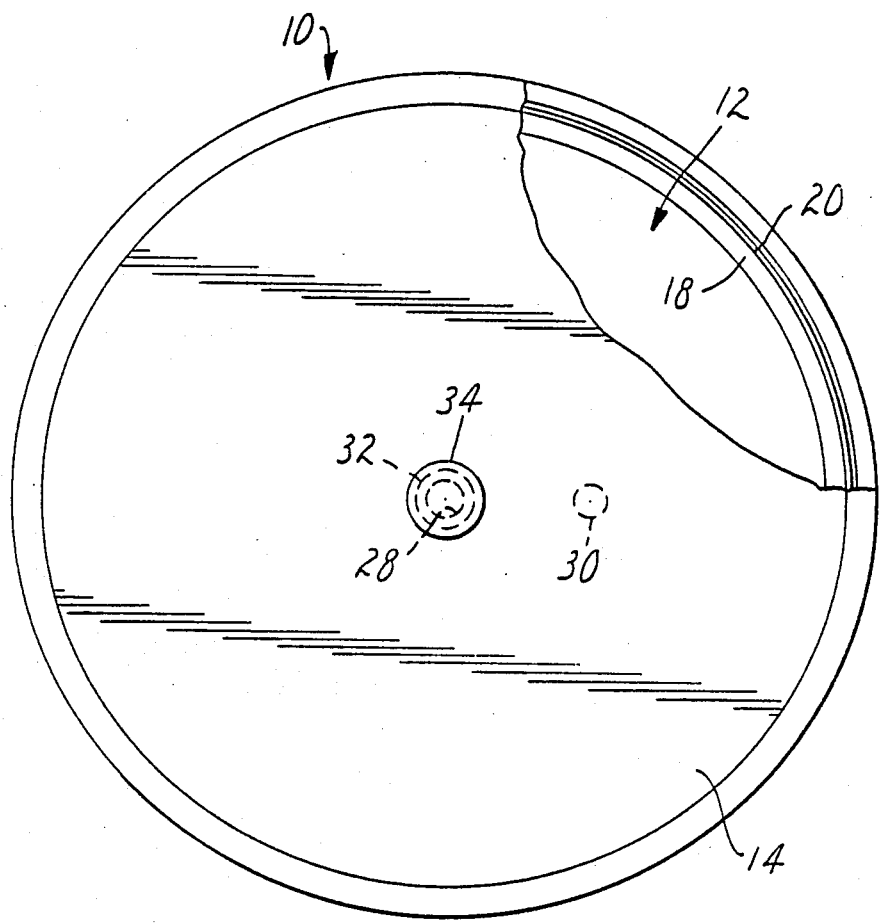
FIG. 1 is a plan view of a first embodiment of a stretched suface recording (SSR) disk assembly according to the present invention having a portion broken away to illustrate interior detail.
Figure 2:
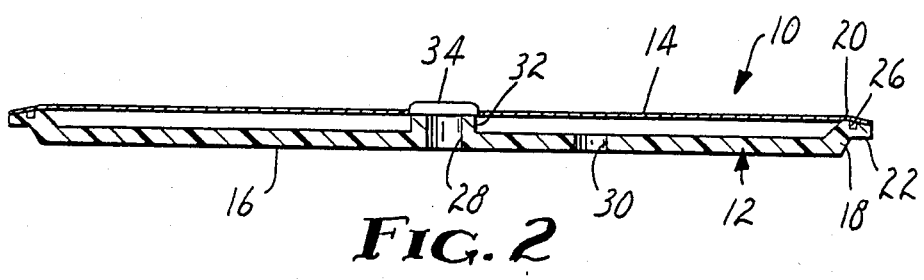
FIG. 2 is a diametrical, cross-sectional elevational view of the SSR disk of FIG. 1.

A first embodiment of a stretched surface recording (SSR) disk assembly 10 is shown in FIGS. 1 and 2. The disk assembly 10 includes a support 12 across which is stretched a thin film recording surface 14.

Figure 3:
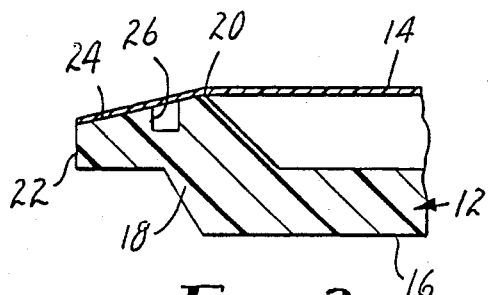
FIG. 3 is an enlarged, partial, diametrical, vertical sectional view of the SSR disk of FIG. 1.

The support 12 includes a disk-shaped base 16 and an annular upstanding rim 18 extending generally perpendicular to the plane of the base 16 to which the film 14 may be attached. As best seen in FIG. 3, the rim 18 terminates in a reference surface 20 which defines a plane parallel to and spaced from the base 16.

Extending radially away from the center of the base 16 is a bonding lip 22 which includes a bonding surface 24. The bonding surface 24 is located intermediate the plane of the base 16 and the reference surface 20 and is inclined so that the spacing of the bonding surface 24 from the plane of the base 16 decreases as the radial distance of the bonding surface 24 from the center of the base 16 increases. The bonding surface 24 is inclined to provide tension on the film 14 in a manner to be described below.

The film 14 is stretched across the reference surface 20 and attached to the bonding surface 24 by such conventional techniques as adhesive bonding or ultrasonic welding. An annular groove 26 is provided between the reference surface 20 and the bonding surface 24 to accommodate any surplus adhesive or weld material and ensure that such material does not interfere with contact between the film 14 and the reference surface 20. As implied by its name, the purpose of the reference surface 20 is to provide a flat surface parallel to the base 16 across which the film 14 may be stretched and maintained parallel to the base 16.

As indicated in the introductory portion of this disclosure, the purpose of the structure thus far disclosed is to provide a taut recording surface upon which information such as video pictures may be recorded and from which such information may be read and utilized. The disk 10 is used in conjunction with apparatus such as that disclosed in U.S. Pat. No. 3,509,274 issued to Kihara on Apr. 28, 1970 in which a disk is rotated and movable recording and reproducing magnetic heads contact a stretched film recording surface of the disk to transfer information to and from the disk.

The apparatus of the aforementioned U.S. Pat. No. 3,509,274 operates in a manner similar to a conventional, commercially available videotape recorder with the exception that information is recorded on a planar surface rather than a tape. The advantage of the disk structure over the tape system is that information may be rapidly and randomly accessed by the magnetic heads.

The recording film 14 is stretched to provide a resilient, flat surface which will conform to the magnetic head and irregularities of the head. The film 14 is preferably a polyethylene terephthalate polymer (Mylar) coated with iron oxide and lubricated with graphite. Other polymers or metal foils may be used, however.

The support 12 may be manufactured of wood or metal, but is preferably a plastic to reduce the cost of manufacture and permit the film 14 to be ultrasonically welded to the support 12. The preferred material is a polycarbonate which may be glass filled to provide increased structural rigidity.

Referring again to FIG. 2, there are shown additional features of the support 12 which permit its use with apparatus such as that shown in the above-identified U.S. Pat. No. 3,509,274. The base 16 includes a central bore 28 which accepts a locating pin extending from a turntable (not shown). A radially located second hole 30 in the base 16 accepts a drive pin which extends from the turntable to engage and rotate the support structure 12. Surrounding the central hole 28 is a boss 32 which supports a bearing 34. The bearing 34 may be used to support an arm which forces the disk assembly 10 against the turntable. The film 14 may be interposed between the boss 32 and the bearing 34 or may be cut to accommodate the bose 32.

As indicated above, the preferred material for the support 12 is a glass-filled polycarbonate. The glass filler increases the rigidity of the support 12, but it makes the material difficult to machine and decreases the integrity of the bond between the film 14 and the support 12.

Figure 4:
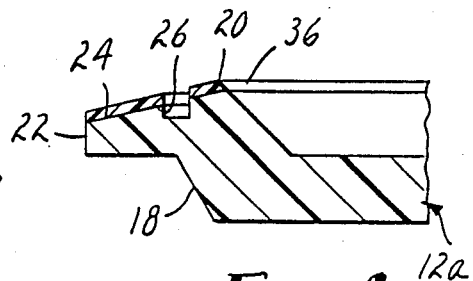
FIG. 4 is an enlarged, partial, diametrical, vertical sectional view of an alternate embodiment of a support which may be incorporated into the SSR disk of FIG. 1.

To overcome these difficulties, there is shown in FIG. 4 a support 12a which is glass filled but includes an integrally molded layer 36 of a plastic which contains no glass reinforcement. The glass-free layer 36 is attached to the support by double molding the support 12a. A mold (not shown) is partially filled with glass-filled material to form a major portion of the support 12a. The remainder of the mold is then filled with a plastic not containing the glass filler to provide an integral surface which may be easily machined and to which the film 14 may be reliably attached. The second layer 36 may be of the same material (polycarbonate) which comprises the bulk of the support 12a or may be another polymer, such as polyethylene terephthalate, which is compatible with that material and the film 14. The result of this two-step molding process is that a structurally rigid support 12a is produced which does not include the disadvantages associated with a glass filler in the area which must be machined and to which the film 14 is attached.

Figure 6:
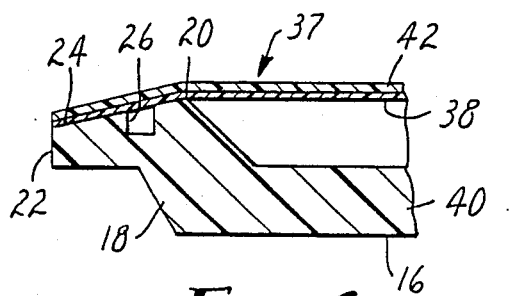
FIG. 6 is an enlarged, partial, diametrical, vertical sectional view of a second embodiment of an SSR disk assembly according to the present invention.
Figure 5:
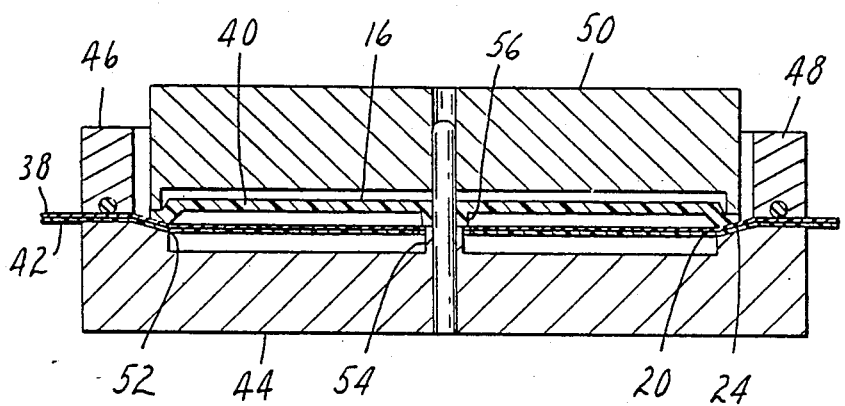
FIG. 5 is a diametrical cross-sectional elevational view of the SSR disk of FIG. 1 in place in an assembly fixture which is also shown in cross-section.

FIG. 5, in one aspect, and FIG. 6, illustrate a second embodiment of an SSR disk assembly 37 and a method of attaching a thin recording film 38 to a support 40 by ultrasonic welding which utilizes a second protective film 42 to protect the recording surface of the film 38 and increase the strength of the bond between the recording film 38 and the support 40. The support 40 of FIGS. 5 and 6 may be either of the supports 12 or 12a described with respect to FIGS. 3 or 4. The recording film 38 of FIGS. 5 and 6 is identical to the recording film 14 described above with respect to FIGS. 1–4.

Although a single layer of film 38 can be attached to the support 40 by means of an adhesive or ultrasonic welding, problems are associated with either of these methods. Because the film 38 is preferably a polyethylene terephthalate polymer (Mylar), adhesive bonding is difficult because the surface of the material is inherently "slick" and does not bond well to adhesives. Additionally, adhesive bonding may not be economical because of the relatively long curing times involved.

Ultrasonic welding has been shown to produce a good bond between the film 38 and the support 40, but the amount of energy used to produce this bond must be closely controlled. Because the film 38 is extremely thin (approximately 0.001 inches or 0.025 mm) if too much energy is imparted to the film 38 during the welding process the film 38 may be crystallized or otherwise degraded, and too little energy will, of course, result in an inadequate bond between the film 38 and the support 40. The range of energy which may be applied to the film 38 may be so narrow, in fact, that reliable bonds cannot be achieved between a single layer of film 38 and the support 40 in a production setting.

It has been found, however, that the useful range of energy which may be applied to the film 38 during the welding process may be increased by simultaneously ultrasonically welding a second protective film 42 to the recording film 38 as the recording film 38 is welded to the support 40. The protective film 42 dissipates and evenly spreads the energy applied to the recording film 38 and allows a greater amount of energy to be applied without degrading the recording film 38.

It has been found that a polyethylene terephthalate protective film 42 of 0.004 inches (0.10 mm) thickness used in conjunction with a recording film 38 having a thickness of 0.001 inches (0.025 mm) allows the range of ultrasonic energy which may be applied to be significantly increased without harming the recording film 38. The range of energy applied may thus be increased to a level which may be controlled during the production process.

Because the recording film 38 is coated with a layer of iron oxide which is graphite lubricated, the bond produced during welding between the protective film 42 and the recording film 38 is not as strong as the bond between the recording film 38 and the support 40. As a result, the protective film 42 may be peeled from the recording film 38 without compromising the integrity of the bond between the recording film 38 and the support 40. The second protective film 42 thus serves a dual purpose. First, it allows the range of ultrasonic energy to be increased and second, it protects the iron oxide coating of the recording film 38 prior to assembly of the disk 10 into its housing.

FIG. 5 illustrates the method of ultrasonically welding the recording film 38 and the second protective film 42 to the support 40 and also illustrates the reason for inclining the bonding surface 24 of the radially extending bonding lip 22 with respect to the plane of the support structure base 16.

FIG. 5 illustrates a welding fixture 44 which includes clamps 46 and 48 located on either side of an ultrasonic welding horn 50. In operation to attach the films 38 and 42 to the support 40, the welding horn 50 is removed and the layers of films 38 and 42 are stretched between the clamps 46 and 48. A support 40 is placed over the recording film 38 and the welding horn 50 is lowered atop the support 40 to force the support 40 downward into contact with the welding fixture 44. An annular surface 52 of the fixture 44 which contacts the protective film 42 is inclined to match the bonding surface 24 of the support 40 and is located below the level of the clamps 46 and 48. Movement of the support 40 below the level of the clamps 46 and 48 forces the films 38 and 42 to be drawn around the reference surface 20 and across the bonding surface 24 of the support 40 which increases the tension of the films 38 and 42 across the support 40. The bonding surface 24 is thus angled to aid in tensioning the films 38 and 42 and ensure that they are not injured by being drawn across a sharp corner during this tensioning step.

Although the bonding surface 24 has been illustrated as being planar in cross-section, it should be recognized that the bonding surface 24 could be convexly radiused and also serve the purpose described above. Whatever the cross-sectional shape of the bonding surface 24, however, it is important that an imaginary extension of the bonding surface 24 across the groove 26 intersect the reference surface 20 so that sharp edges are not presented to the film 38 as it is drawn over the reference surface 20 and along the bonding surface 24.

After the welding horn 50 is fully lowered, ultrasonic energy is applied to bond the films 38 and 42 to the support 40. The welding horn 50 is raised, the clamps 46 and 48 are released, and the films 38 and 42 are advanced to again initiate the assembly process.

FIG. 5 also illustrates a second method which may be used to tension the films 38 and 42 across the support 40. The welding fixture 44 includes a central tubular extension 54 which arrests the motion of a boss 56, identical to the boss 32, of the support 40 before the reference surface 20 and the bonding surface 24 of the support 40 reach the films 38 and 42. Lowering of the welding horn 50 forces the perimeter of the support 40 into contact with the welding fixture 44 and deflects the center of the support 40 with respect to the bonding surface 24 in a direction perpendicular to the plane of the support base 16 and away from the rim 18. This deflection of the base 16 causes the diameters of the reference surface 20 and the bonding surface 24 to decrease. After the support 40 is fully deflected into contact with the fixture 44, the films 38 and 42 are welded to the support 40 and the ultrasonic horn 50 is removed. The base 16 of the support 40 then returns to its original, undeflected configuration which increases the diameters of the reference surface 20 and the bonding surface 24, thus stretching the films 38 and 42 and applying additional tension to these films.

While the present invention has been described in connection with certain specific embodiments, it is to be understood that it is not to be limited to those embodiments. On the contrary, it is intended to cover all alternatives and modifications falling within the spirit and scope of the invention as set forth in the appended claims.

We claim:

1. A method of attaching film to a support which includes a disk-shaped base and an upstanding annular rim extending from the perimeter of said base and terminating in a bonding surface comprising:
    stretching a recording film to cover said bonding surface;
    supporting the perimeter of said base opposite said rim;
    deflecting the center of said base perpendicular to the plane of said base in the direction away from said rim so that said bonding surface decreases in diameter;
    bonding said recording film to said bonding surface; and
    ceasing to deflect said base so that the diameter of said bonding surface increases to tension said recording film.

2. The method of claim 1 wherein said bonding of said recording film to said bonding surface is accomplished by ultrasonic welding.

3. The method of claim 1 further including the step of bonding a protective film to said recording film.

4. The method of claim 3 wherein said bonding of said recording film to said bonding surface and said bonding of said protective film to said recording film is accomplished by ultrasonic welding.

5. The method of claim 4 wherein said welding of said recording film to said bonding surface and said welding of said protective film to said recording film is accomplished simultaneously.

* * * * *